(12) United States Patent
Cohen

(10) Patent No.: US 8,292,484 B2
(45) Date of Patent: Oct. 23, 2012

(54) ILLUMINATION POI

(76) Inventor: Shahar Cohen, Jaffo (IL)

( * ) Notice: Subject to any disclaimer, the term of this patent is extended or adjusted under 35 U.S.C. 154(b) by 333 days.

(21) Appl. No.: 12/532,436

(22) PCT Filed: Mar. 23, 2008

(86) PCT No.: PCT/IL2008/000403
§ 371 (c)(1),
(2), (4) Date: Sep. 22, 2009

(87) PCT Pub. No.: WO2008/117280
PCT Pub. Date: Oct. 2, 2008

(65) Prior Publication Data
US 2010/0060199 A1    Mar. 11, 2010

Related U.S. Application Data

(60) Provisional application No. 60/919,535, filed on Mar. 23, 2007.

(51) Int. Cl.
*F21K 2/00* (2006.01)
(52) U.S. Cl. .......................... 362/577; 362/106
(58) Field of Classification Search .................. 362/554, 362/102, 106, 577
See application file for complete search history.

(56) References Cited

U.S. PATENT DOCUMENTS

2003/0234914 A1* 12/2003 Solomon ..................... 353/122
2006/0084512 A1*  4/2006 Cohen ............................ 472/57
* cited by examiner

*Primary Examiner* — John A Ward
(74) *Attorney, Agent, or Firm* — Mark M Friedman

(57) ABSTRACT

An illumination poi is provided, comprising light emitters and light waveguides optically coupled to the light emitters. In some embodiments, the light waveguides are optical fibers. A microchip light controller, associated with the light emitters, varies the light entering the optical fibers, and facilitates spectacular light pattern upon rotation of the illumination poi in the dark.

21 Claims, 21 Drawing Sheets

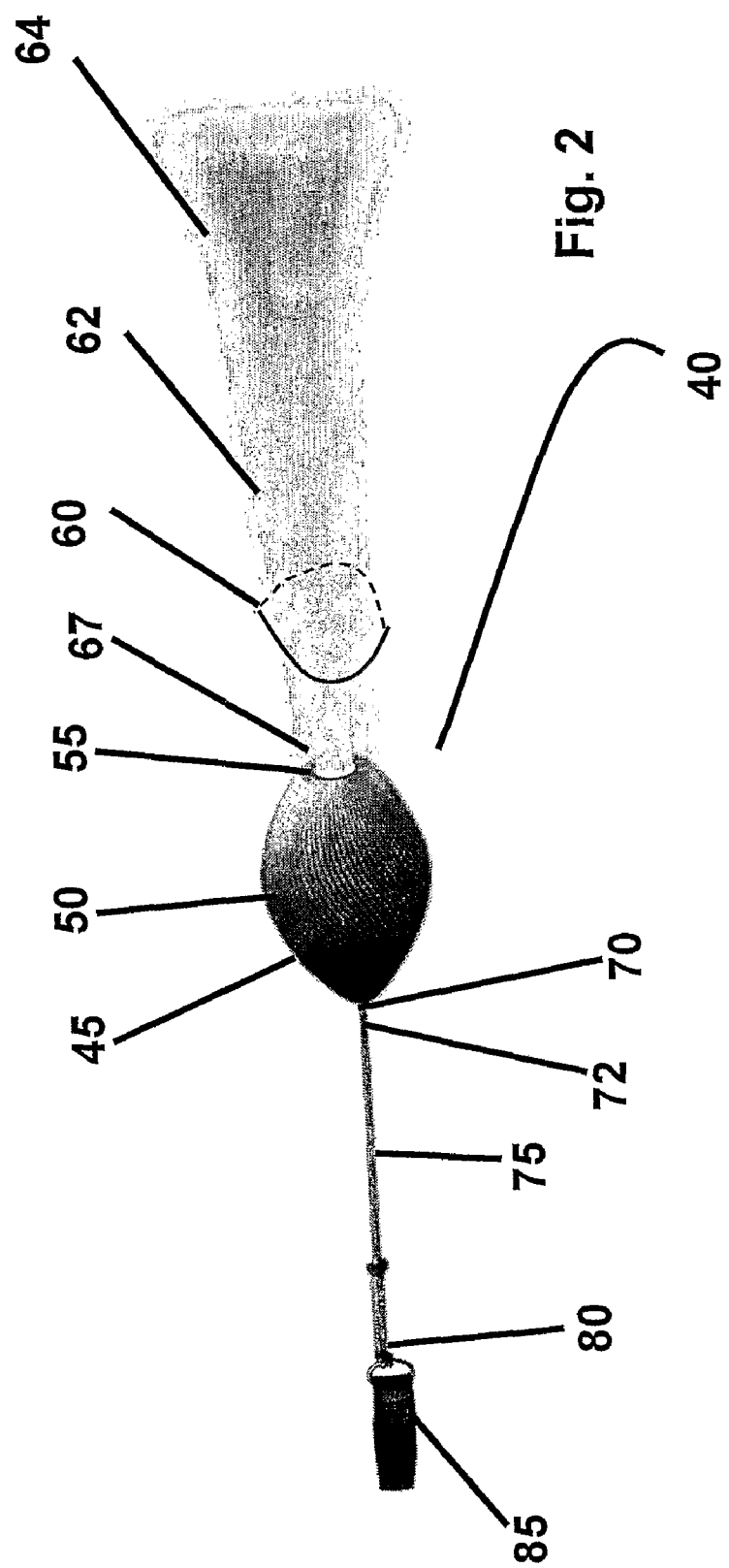

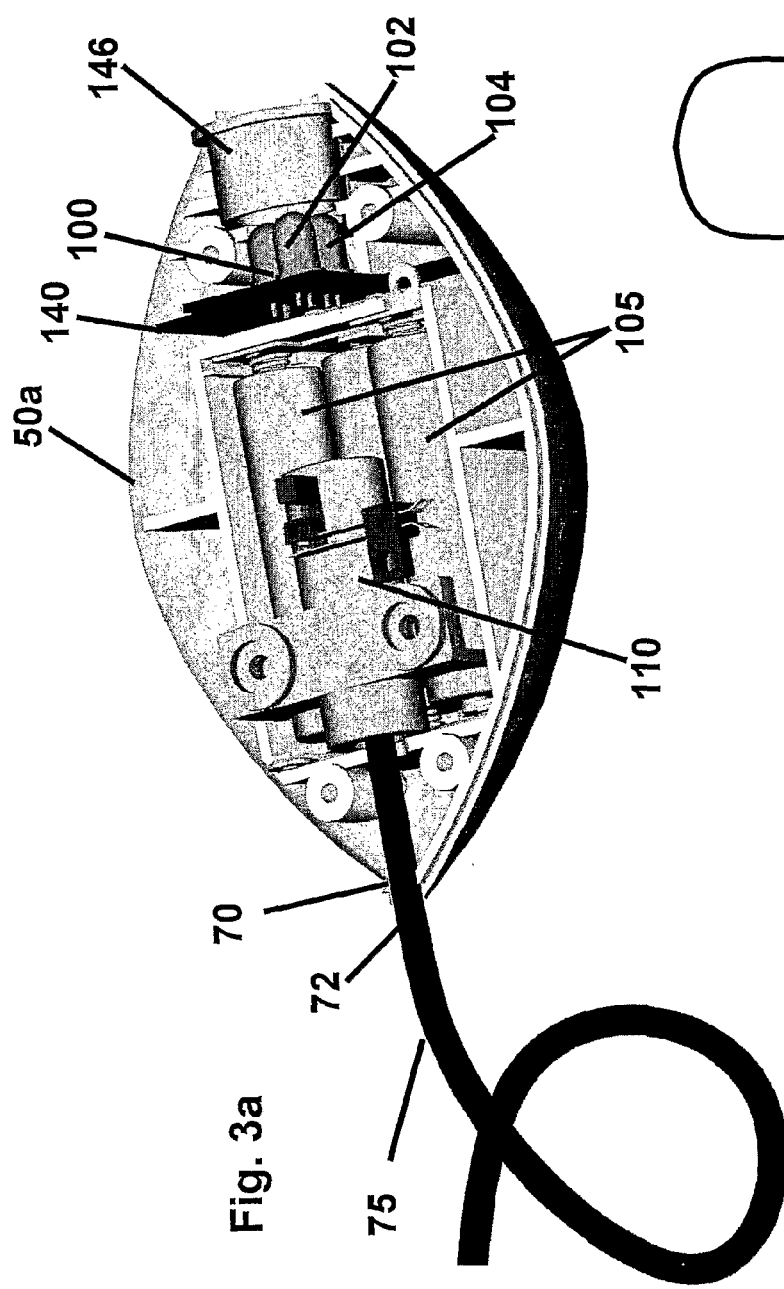
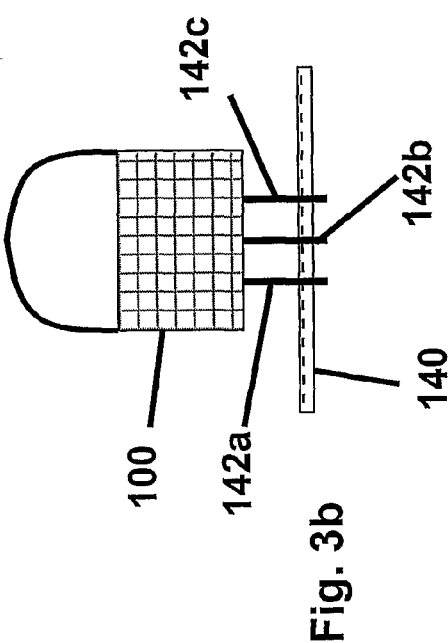
Fig. 3a
Fig. 3b

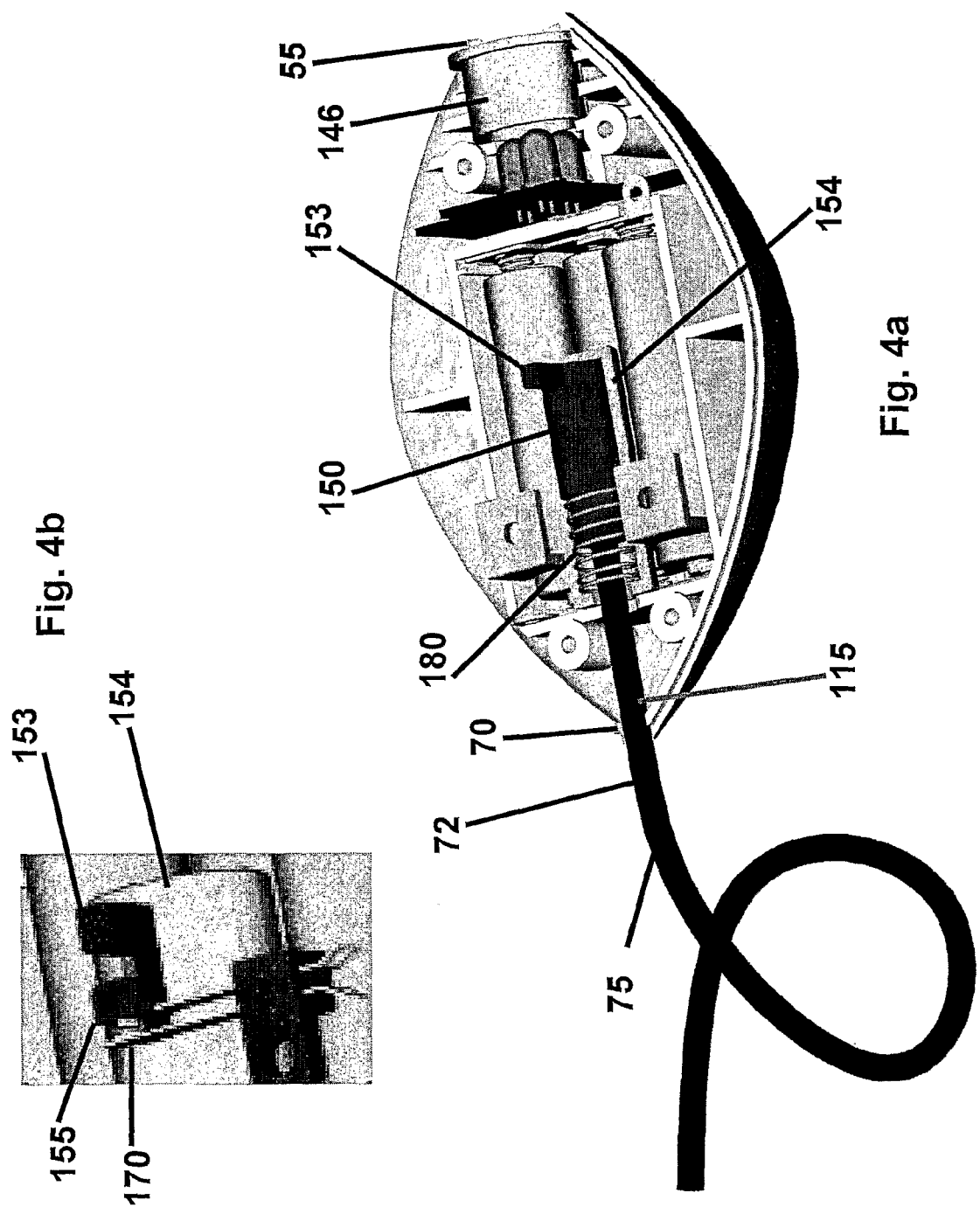

200

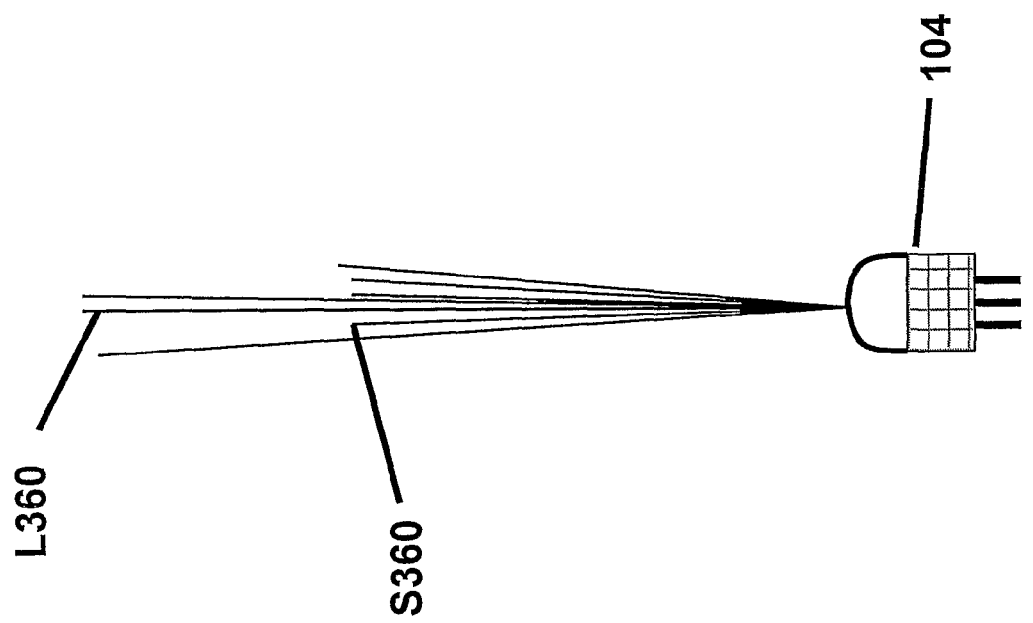

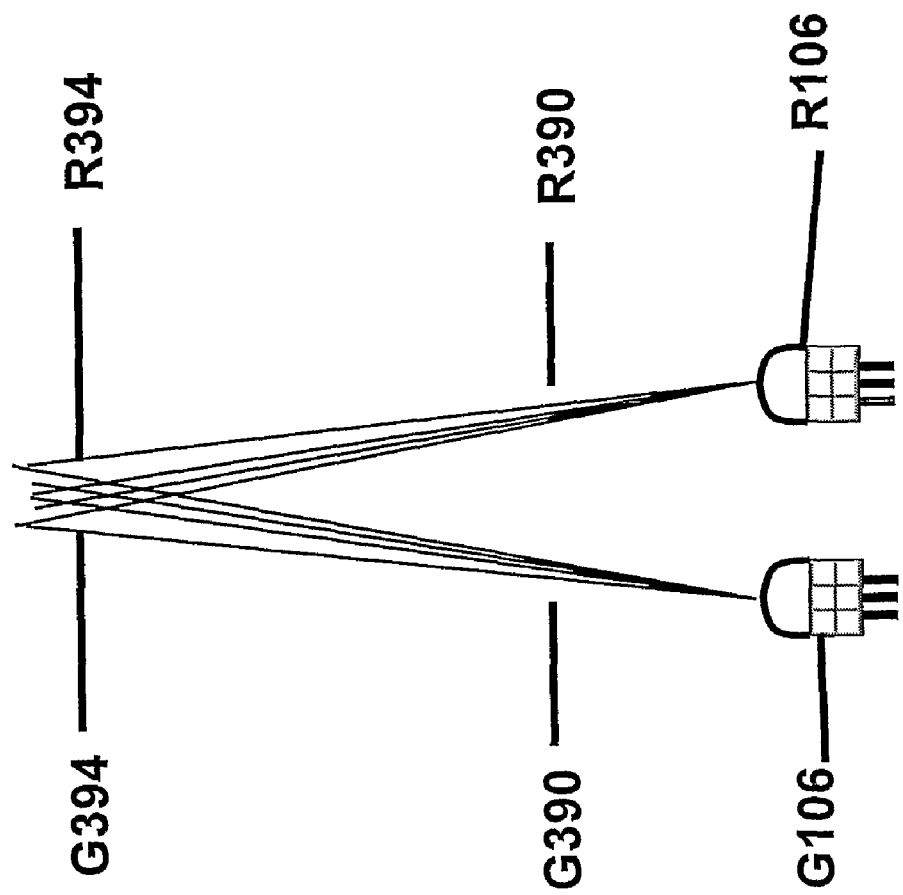

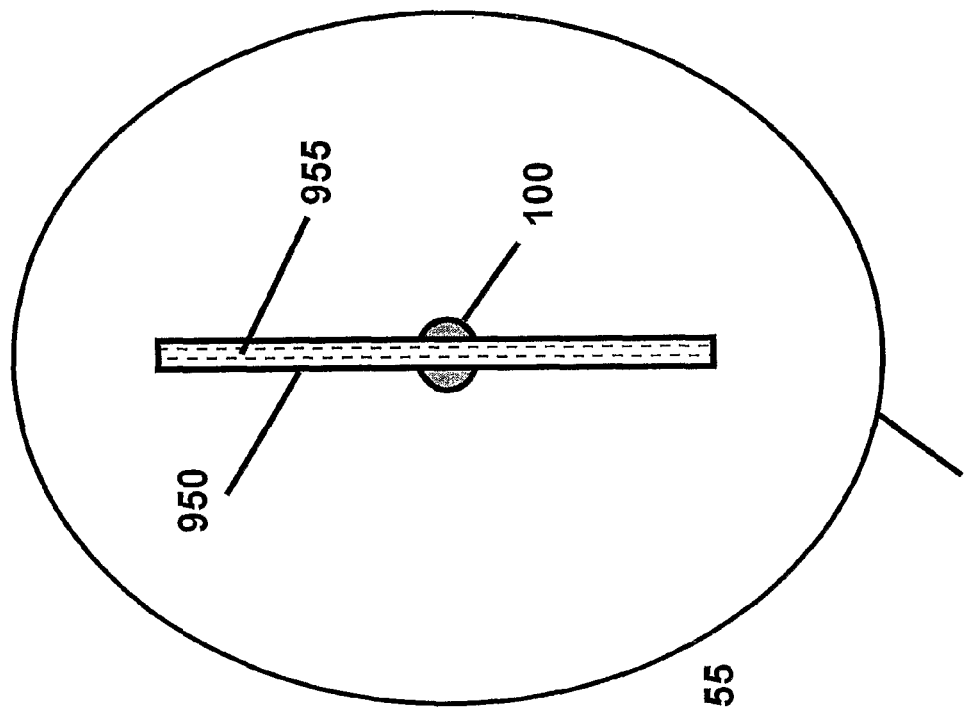
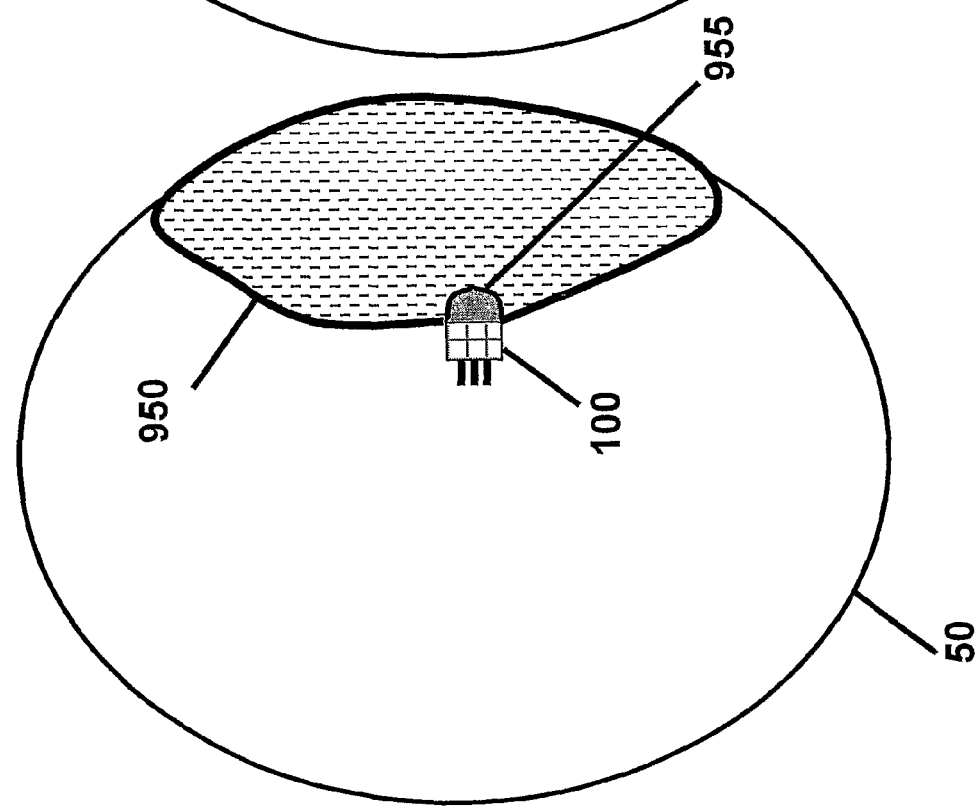

ILLUMINATION POI

RELATED APPLICATIONS

This patent application is a U.S. National Phase Application of PCT/IL2008/000403 filed on Mar. 23, 2008, which claims priority of U.S. Provisional Patent Application No. 60/919,535 filed Mar. 23, 2007, the contents of which are incorporated herein by reference.

TECHNICAL FIELD

The present invention relates to a juggling tool and, in particular, to an illumination poi configuration based on a weight having a light emitter coupled to waveguides, such as a bundle of optical fibers.

BACKGROUND OF THE INVENTION

An illumination poi is a juggling apparatus that enables performance of various types of juggling moves, which moves exhibit spectacular light patterns. The present invention provides an illumination poi with light emitting diode (LED) as the source of light, with optical fibers as the main channel to radiate the light emitted by the LEDs, and with one or more light controllers.

Currently the illumination poi of the present invention is used as a juggling apparatus in many countries around the globe.

A typical poi is made up of a cable, a wire, a chain, or a cord, connecting one end to a weight and the other end to a handle. By oscillating the hand holding the handle, the weight can be swung in a simple motion in one plane of rotation or in complex changing motions, causing intriguing effects. The combination of simple structure, visually pleasing performance and enjoyable athletic activity makes the use of the poi popular among professional and amateur jugglers.

The origin of the poi is presumed to be in New Zealand. Poi is a Maori, (native New Zealand language) word for a ball on a string. Poi is both singular and plural.

The first use of the poi, as a simple stone tied to a rope, was as a weapon. Over the time the poi was refined and was also used for fun, ceremonies, dancing, and as a means to develop coordination and athletic abilities. The evolution of means of warfare to sports, games, toys, and juggling apparatus is a well-known phenomenon, for example, in fencing, nunchaku, javelin throwing, and hammer throwing.

As used herein the specifications and claims, the term poi refers to a weight connected to one end of a flexible long connector that enables swinging it around the body in various ways by grasping the other end of the connector and moving it with proper movements, serving as a juggling apparatus.

The poi may have a handle at the other end of the connector. The dimensions and mass configurations of the poi are adjusted to the juggler's body size, to assure the ability of performing simple and complex rotational moves around the human body or in proximity to the juggler. These characteristics distinguish the poi from small weights and string hand toys.

In illuminating poi of the prior art, illustrated in FIG. 1, a source of light is disposed within a weight, and once the weight moves in the dark, the emitted light exhibits fascinating light patterns.

Referring now to prior art, U.S. Pat. No. 7,300,329 to Cohen discloses that a poi weight can contain and carry a variety of means, such as light, fire, strips, or a whistle in order to increase the visual and sound effects of the performance. The visual and sound effects of the performance can be dependent on the poi rotational direction, such that when the juggler changes the rotational direction the means change the emitted colored light to another color, a color centered around another wavelength, or change the emitted sound to another sound, a sound of another wavelength.

U.S. Pat. No. 7,037,169 to Benedek, discloses illuminating and rotating toy wherein the illumination scheme depends spatially and temporally on rotational parameters. In one embodiment, Benedek describes a top comprising a rotation rate measuring device, an array of LEDs, and a controller that dominate the LEDs. The rotation data is transferred to the controller that turn the LEDs on in synchronization with the rotational motion.

Optical fibers are used in several toys and devices of the prior art for the visual effect of dispersed light. A well known device employs optical fibers extending from the end of a penlight flashlight.

SUMMARY

It is provided, for the first time, a poi weight that includes a casing, one or more light emitters mounted inside the casing, one or more light waveguides, and one or more light controllers. The light waveguides have a proximal end optically coupled to at least one of the light emitters and a distal end disposed outside that casing. Those distal ends are configured to scatter light propagating in the light waveguide. The light controllers are associated to the one or more light emitters and configured to vary at least one parameter of the light entering into the one or more light waveguides.

In some embodiments, the poi weight further comprises a suspension element which is attached to that weight.

In some embodiments, the weight has at least one cross section roughly shaped as an ellipse.

In some embodiments, the casing is made of a translucent material.

In some embodiments, the poi weight further comprises an elastic sheath disposed over the casing. The elastic sheath absorbs at least part of a shock occurring as a result of a collision between the weight and an entity.

In some embodiments, the casing comprises two compartments and having an open state, in which state a user may dispose detachable objects within one of the compartments.

In some embodiments, the light emitters comprise one or more light emitting diodes.

In some embodiments, the light emitters are electrically empowered by one or more rechargeable batteries disposed within the casing.

In some embodiments, the light controller is loaded with two or more illumination programs.

In some embodiments, the poi weight further comprises a motion sensor wherein the light controller varies at least one parameter of the light entering into one or more light waveguides in accordance with one or more parameters of weight motion.

In some embodiments, the light controller is configured to receive one or more parameters of motion data, the light controller varies at least one parameter of the light entering into one or more light waveguides in accordance with the one or more parameters of motion data.

In some embodiments, the poi weight of claim further comprises a switch and a suspension element attached to the switch, wherein whenever the suspension element pulls the switch, the switch is turned on, switching the light controller on.

In some embodiments, the light waveguides are optical fibers.

In some embodiments, the light waveguides comprise two groups of optical fibers, a first group of optical fibers of a first substantially equal length, and a second group of optical fibers of a second substantially equal length, the first length being greater than the second length.

In some embodiments, the light emitters comprise a first light emitter emitting a first color, and a second light emitter emitting a second color.

In some embodiments, the light emitters comprise a first light emitter emitting a first color, and a second light emitter emitting a second color. The light emitted of the first emitted is intermixed with the light emitted of the second light emitter causing a color perception in accordance with a colorimetric blend of the two colors.

In some embodiments, the poi weight further comprises a communication interface connecting at least one of the light controllers to a device residing outside the weight.

In some embodiments, the light emitters comprise one or more visible laser diodes.

In some embodiments, the poi weight further comprises a rotation data sensor measuring one or more rotation parameters and transferring the one or more rotation parameters to the light controller. The light controller varies one or more parameters of light entrance to the light waveguides in accordance with the one or more rotation parameters.

In some embodiments, another poi weight of approximately same weight and external shape is connected to the poi weight, the two poi weights being parts of a symmetric poi.

In some embodiments, the poi weight comprises at least one flat light waveguide. That flat waveguide has a proximal end configured for efficient optical coupling with at least one light emitter, and has a distal end configured to scatter light outside the casing into a wide light trail.

It is disclosed, for the first time, a method for enabling a person to perform illumination poi moves, the method comprising the steps of providing the person with an illumination poi and allowing the person to perform illumination poi moves. The illumination poi comprises a suspension element and a weight connected to the suspension element. The weight includes a casing, one or more light emitters mounted inside the casing, one or more light waveguides, and one or more light controllers. The light waveguides have a proximal end optically coupled to at least one of the light emitters and a distal end disposed outside that casing. That distal end is configured to scatter light propagating in the light waveguide. The light controllers are associated to the one or more light emitters and configured to vary at least one parameter of the light entering into the one or more light waveguides.

In some embodiments, the method includes the step of determining one or more parameters of the spectacular light patterns by maneuvers conducted in accordance with the variation by a light controller of one or more parameters of the light entering the light waveguides.

In some embodiments, the method further comprises the step of coding a color varying time sequence in an illumination program using the illumination poi and a computing device connected to the illumination poi.

These and further embodiments will be apparent from the detailed description and examples that follow.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 1 (PRIOR ART) shows an illumination poi of the prior art.

FIG. 2 is a perspective view of an illumination poi according to some embodiments of the present invention.

FIG. 3a is a perspective view of an open weight casing.

FIG. 3b is a schematic drawing of a light emitting diode connected to a printed circuit board.

FIG. 4a is a perspective view of a centrifugal electric switch.

FIG. 4b is a perspective enlarged view of a toggle.

FIG. 8a is a schematic drawing of two bundles of optical fibers of different length optically coupled to a single light emitting diode.

FIG. 9a is a schematic diagram of two bundles of optical fibers each optically coupled to a LED of different color while their distal ends are intermixed.

FIG. 18a is a side view of a flat light waveguide optically coupled to a light emitting diode.

FIG. 18b is a front view of a flat light waveguide optically coupled to a light emitting diode.

Figure 2B:
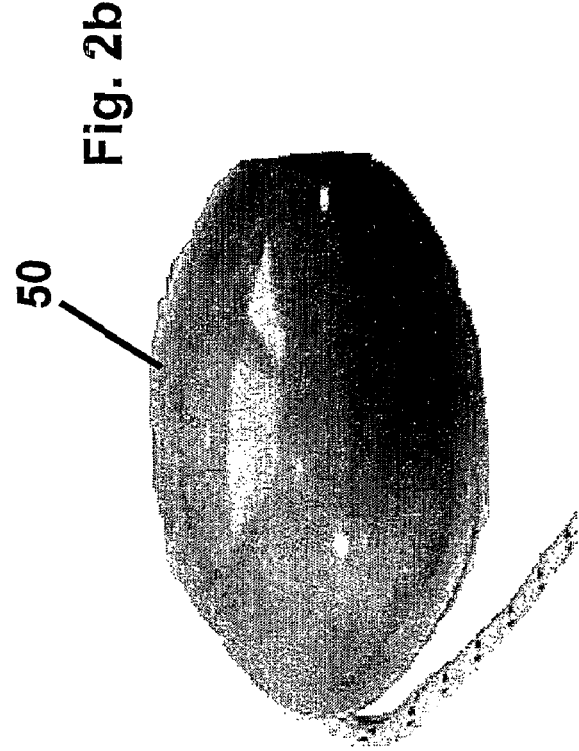
FIG. 2b is a perspective view of a translucent casing of a weight according to some embodiments.

It will be appreciated that where considered appropriate, reference numerals may be repeated among the figures to indicate corresponding or analogous elements.

DESCRIPTION OF THE PREFERRED EMBODIMENTS

The present invention will now be described in terms of specific example embodiments. It is to be understood that the invention is not limited to the example embodiments disclosed. It should also be understood that not every feature of the methods and systems handling the described illumination poi is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The materials, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Figure 2C:
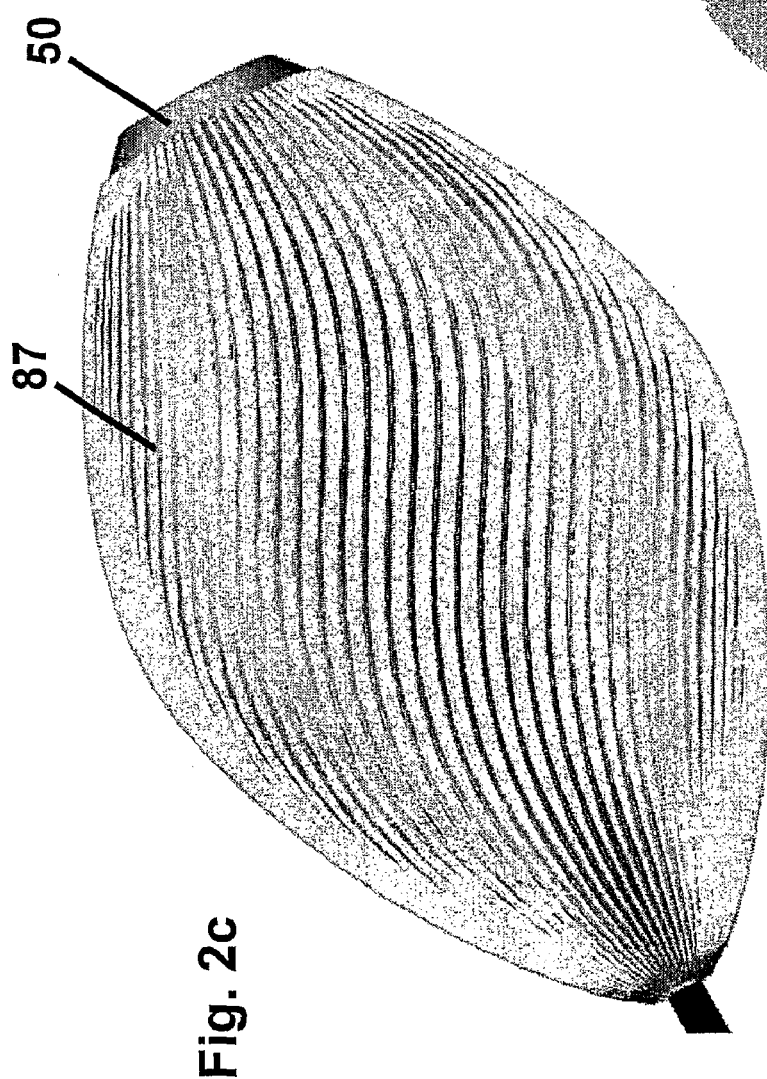
FIG. 2c is a perspective view of a perturbed elastic envelope of a weight casing.

A first embodiment of the invention is illustrated in FIG. 2, which shows an illumination poi 40 with a weight 45. The weight 45 has a rigid translucent casing 50 able to receive a plurality of objects. A bundle 60 of optical fibers 62 is connected to the weight 45. The bundle's distal end 64 spreads like a brush even at rest, while the bundle's proximal end 67 penetrates the casing 50 through an aperture 55.

It should be noted that the word "weight" is used in the art of poi for an element heavy enough to move in a substantially ballistic motion when thrown in air, without being influenced to an appreciable extent by the wind. The weight described here may be heavy enough due to functional internal objects that no non-functional objects are needed for the sake of having sufficient weight.

The casing 50 has a cross section roughly shaped as an elongated ellipsoid, with apertures 55 and 70 positioned on opposing vertexes, as shown in FIG. 2*b*. The casing 50 is covered with an elastic sheath envelope 87, which may be removed from the casing 50 to enable its opening. The elastic sheath 87 protects casing 50 by absorbing at least part of a shock occurring as a result of any accidental collision between the weight and an entity such as a juggler's body, a part of the body of a show attendee, the ground, a part of a building or any other object. Sheath 87 may be formed with protrusions, such as the protruding ridges shown here. The protrusions on the elastic sheath 87 serve an aesthetic purpose and a protective purpose, as they absorb shock by both a local shrinkage and a lateral deflection.

A suspension element 75, preferably of adjustable length, is connected to the weight 45. One terminal 72 of suspension element 75 is encircled slidably by a gland aperture 70 and attached inside the casing to an internal object as detailed below. A handle 85 is securely fastened to a second terminal 80 of the suspension element 75.

Referring to the adjustable length of suspension element 75, a user may change the length to fit his height, such that the same illumination poi may be used for several members of a family, for example.

In some embodiments, the suspension element 75 is one of a wire, a spring, a strap, a string or a chain.

In some embodiments, the handle is a double or single buttonhole finger strap.

The casing 50 is made of two compartments connected by four screws. FIG. 3*a* shows one compartment 50*a* housing several objects.

FIG. 3*a* shows three light emitting diodes (LEDs) 100, 102 and 104, which are disposed close to aperture 55. LED 100, for example, has three leads 142*a*, 142*b* and 142*c*, as illustrated in FIG. 3*b*. The leads are soldered to a printed circuit board (PCB) 140, which, in turn, is affixed to compartment 50*a*. Besides serving as a rigid basis for the LEDs, the PCB 140 hosts a microchip light controller, which is connected to one or more batteries 105, and serves as a power supply to the LEDs through leads 142*a*, 142*b* and 142*c*. The light controller is loaded with illumination programs as detailed below.

In some embodiments, the batteries 105 are of the widely and cheaply available types, such as AA batteries.

In some embodiments, the batteries 105 are rechargeable batteries. In one embodiment, the rechargeable batteries may be charged through an appropriate aperture in casing 50, and there is no need to open the casing for charging the batteries.

The proximal end 67 of the bundle 60 of optical fibers 62 penetrates casing aperture 55, and is securely fastened inside the lumen of sleeve 146. The ends of the optical fibers 62 at the proximal end 67 are optically coupled to the LEDS 100, 102, and 104 by proximate juxtaposition. The optical fibers 62 at the distal end 64 are cut such that light propagating in the optical fibers 62 is scattered out of the optical fibers 62.

A centrifugal electrical switch 110 is connected to the microchip light controller. The switch 110 has an operative state in which it closes an electrical circuit and turns the light controller on, and a non-operative state in which the electrical circuit is open and the light controller is off.

The centrifugal electrical switch 110 may be implemented as a dual state toggle 150, which is housed within cylindrical tube 154. In FIG. 4*a* the upper part of cylindrical tube 154 is removed to show a spring 180, which pushes the dual state toggle 150 towards a non-operative toggle state, shown in FIG. 4*b*, with no electrical contact between conductors 155 and 170. Thus, at rest, the electrical circuit operating the light controller is open, and the light controller is not operating. As mentioned, the casing aperture 70 is a gland aperture that slidably encircles the terminal 72 of the wire 75, which is fastened inside the casing 50 to an internal object part. The internal object is toggle 150.

During a juggler move in the dark, the weight 45 rotates, and a centrifugal force drives the weight centripetally off the connecting wire 75; this induces tension between the first connector terminal 72 and the dual state toggle 150. As the induced tension grows against a counter force exerted on the toggle 150 by the spring 180, the first connector terminal 72 continuously slides inside the gland aperture 70, pulling the toggle 150 so that peg 153 pushes contact 155 towards contact 170, closing the electrical circuit that turns the light controller on. The light controller allows the batteries to provide electric current to the LEDs according to an illumination program. In turn, the LEDs emit light, which is optically coupled into the optical fibers. The light propagates inside the optical fibers and is scattered through their ends, exhibiting a spectacular light pattern.

In some embodiments, the centrifugal switch is configured to open an electric circuit in its operative state, rather than closing an electric circuit as described above. In such a configuration, light emission is terminated only upon full rest.

The automatic switching of light emission lengthens battery life or increase time between recharging, depending on batteries used.

In some embodiments, a simple on-off switch is attached to the handle and is connected to the weight 45 through an electric wire that is attached to the suspension element 75, as an alternative to centrifugal switch 110.

In some embodiments, the weight 45 includes an sound generating element that is also controlled by the light controller in synchronization with light emission and motion.

Figure 5:
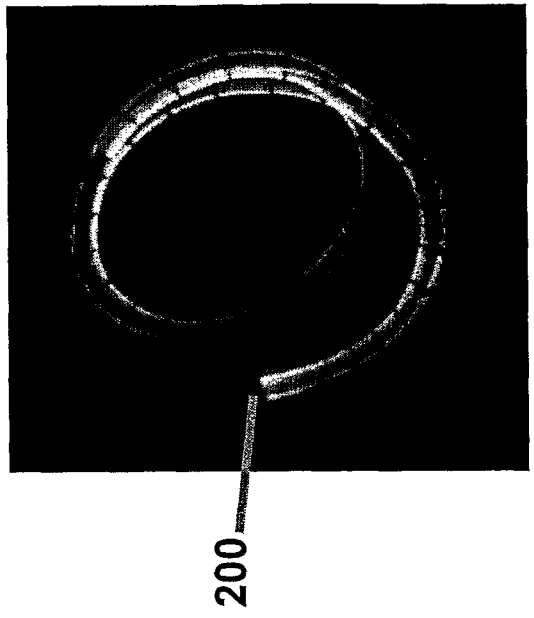
FIG. 5 is a photograph of a spectacular light pattern showing commencing of light emittance.

FIG. 5 demonstrates a digital photograph of a light pattern exhibited when a juggler moves the poi in a rotational move in the dark. Initially, no light is scattered out of the optical fibers and the weight is unseen due to the dark. Suddenly, at point 200 along the weight's orbit, toggle 150 generates an electrical contact, and light starts to appear in the dark, showing the weight's orbit in space. The fast weight motion is manifested as a continuous light pattern due to persistence of vision, applicable for both a human observer and an electronic camera. The appearance of segments along the weight orbit is determined by the illumination program as detailed below.

Figure 6:
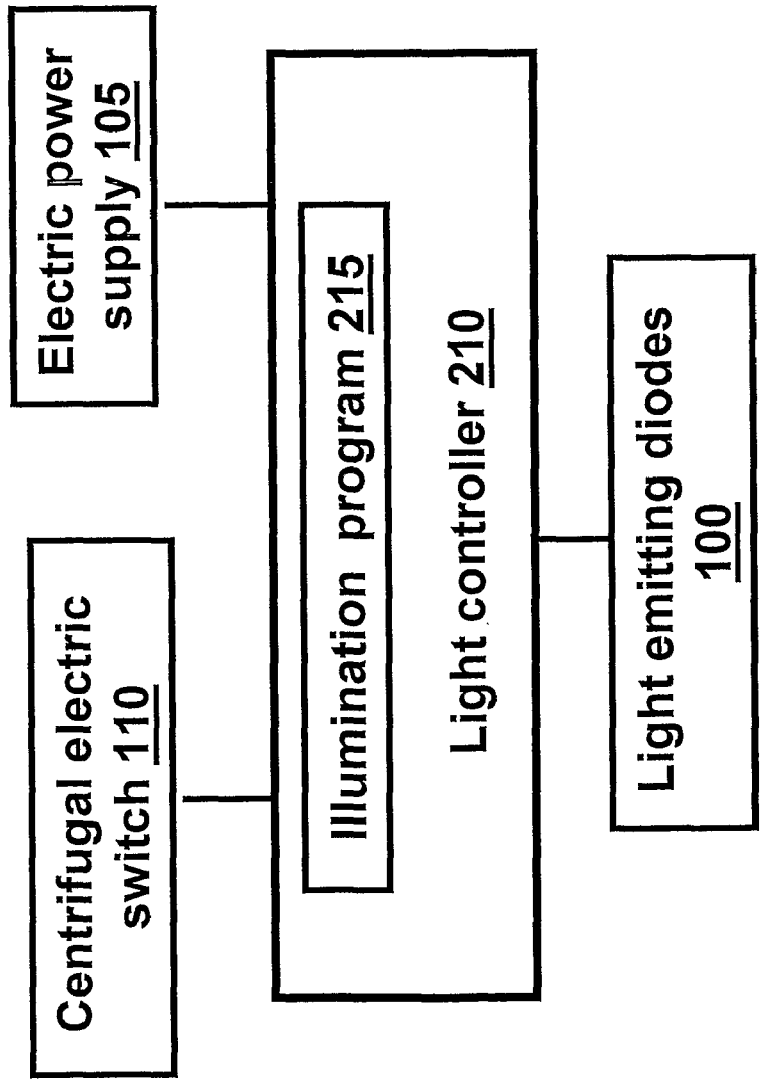
FIG. 6 is a block diagram of the electrical components of an illumination poi.

FIG. 6 shows a block diagram of the electrical components of the weight, according to some embodiments. Batteries 105 supply electric current to LED 100 through light controller 210, which is loaded with a plurality of illumination programs 215. The light controller 210 is also connected to the centrifugal electrical switch 110. Once the centrifugal electrical switch is turned on, the light controller allows the batteries to provide electric current to the LEDs according to one of the illumination programs 215.

In some embodiments, the light controller may use several illumination programs 215 in a cycle. Every time the light controller is turned on, a fresh illumination program drives the LEDs. As the juggler may stop the weight motion quite often, for example by reversing direction of rotation from clockwise to counterclockwise and vice versa, a new light pattern appears frequently, making the performance much more vivid and exciting.

Figure 7A:
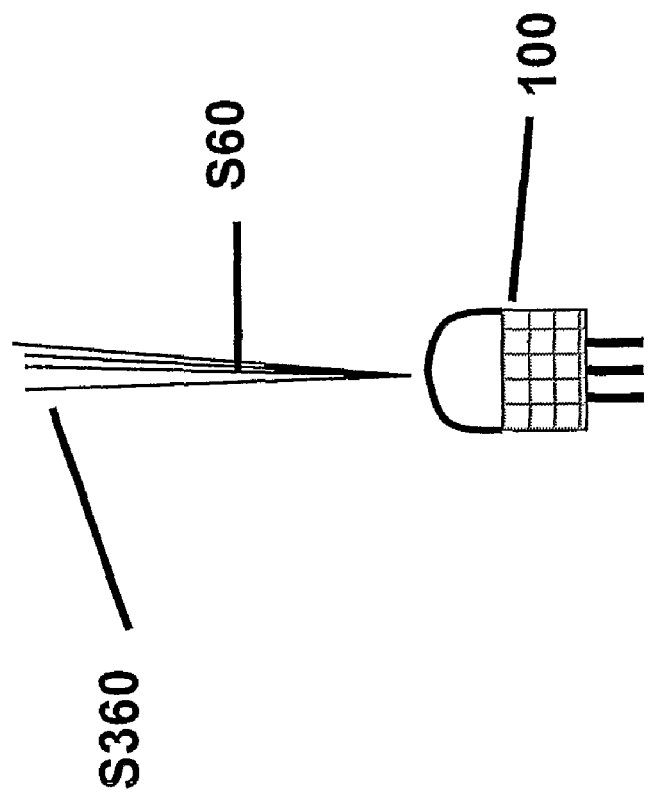
FIG. 7a is a schematic drawing of a short bundle of optical fibers optically coupled to a light emitting diode.
Figure 7B:
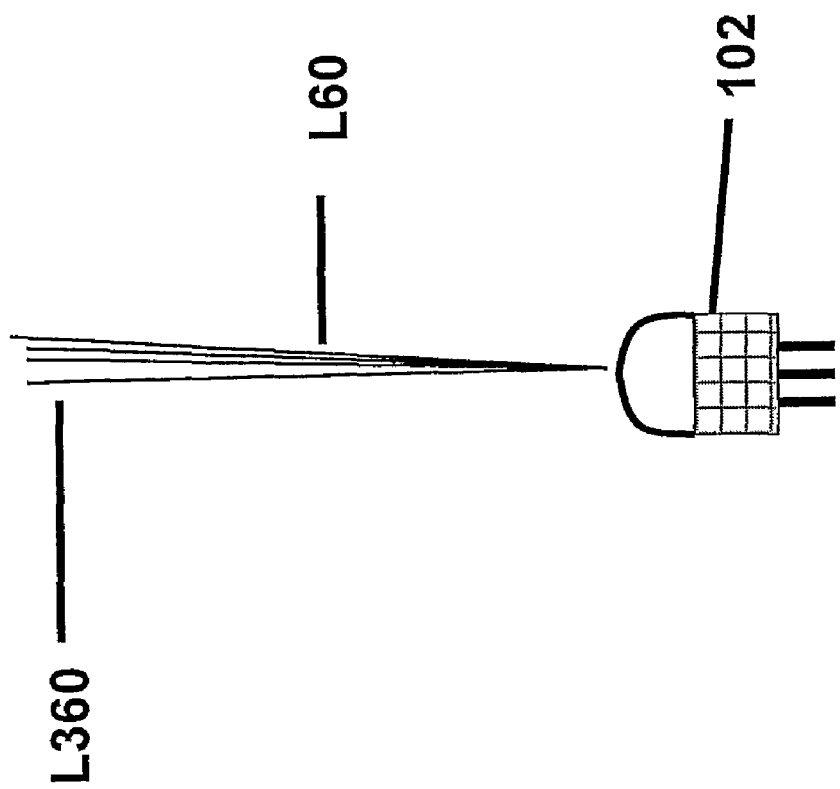
FIG. 7b is a schematic drawing of a long bundle of optical fibers optically coupled to a light emitting diode.

In some embodiments, as illustrated in FIG. 7*a* and FIG. 7*b*, there are two bundles of optical fibers of two lengths: a first bundle S60 of optical fibers of a first equal length, optically coupled to LED 100 and a second bundle L60 of optical fibers of a second equal length, optically coupled to LED 102. The second length is larger than the first length.

Figure 8B:
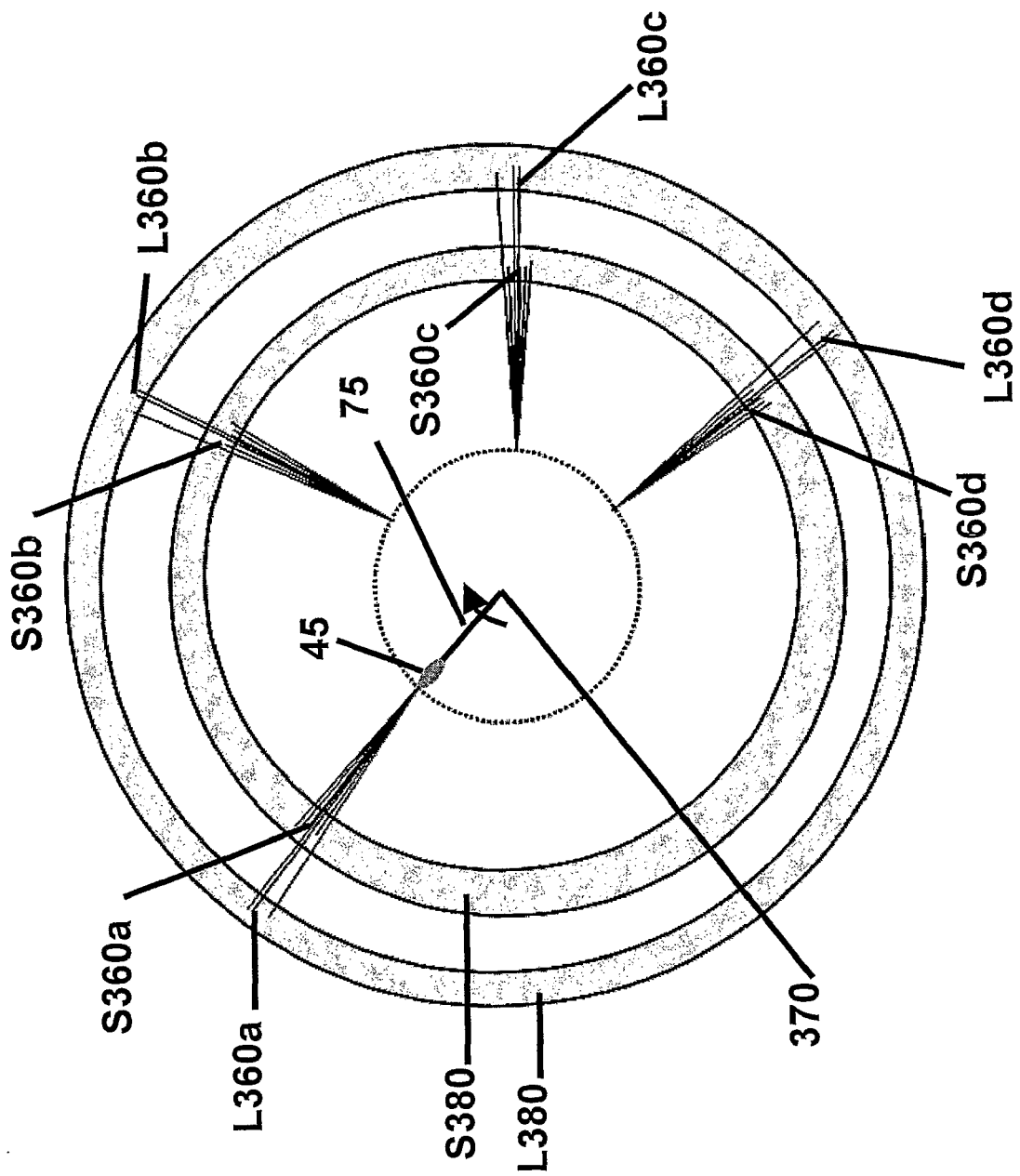
FIG. 8b is a schematic diagram of a double ring light pattern exhibited by a rotation move of a weight with two bundles of optical fibers of different length.

In some embodiments, two bundles, S60 and L60, are optically coupled to the same LED as depicted in FIG. 8*a*. In the example of FIG. 8*b*, a juggler handles the poi and rotates it circularly around a circle center 370. Rotating clockwise, the distal ends S360 and L360 move sequentially along locations S360*a*, S360*b*, S360*c*, S360*d*, and L360*a*, L360*b*, L360*c*, L360*d*, sweeping ring zones S380 and L380, respectively. The light propagating in bundle S60 is scattered out the optical fibers in the ring zone S380, while the light propagating in bundle L60 is scattered out the optical fibers in the ring zone L380. As the ends of the optical fibers at the distal end of each bundle spread outside a two-dimensional plane of rotation, a visual effect of a three-dimensional torus is exhibited.

Figure 8C:
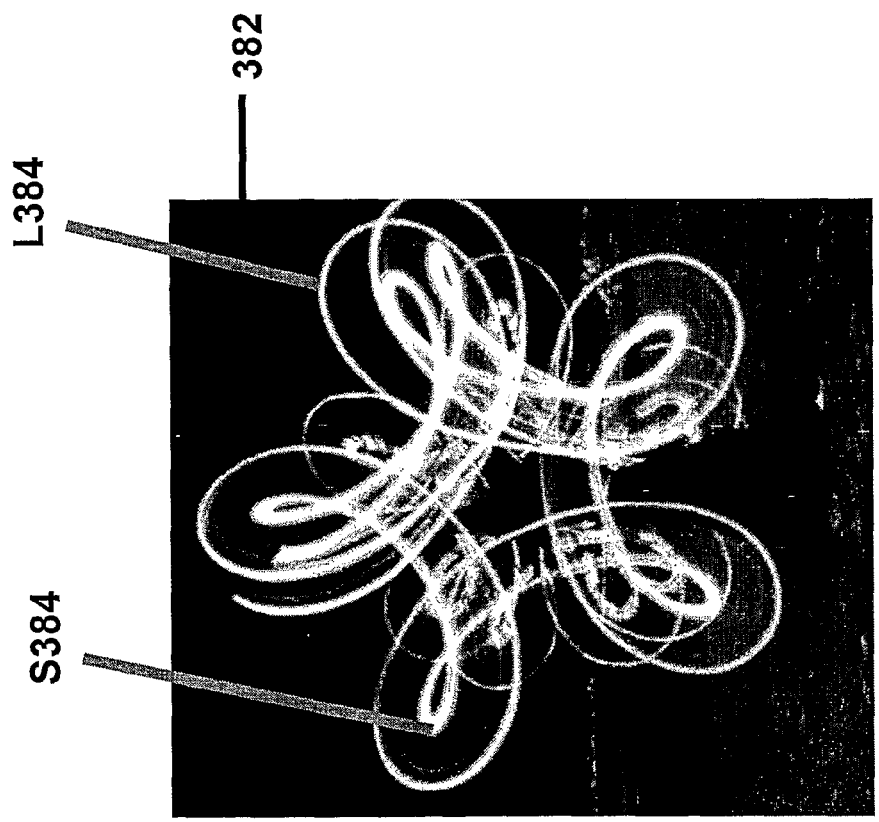
FIG. 8c is a photograph showing a double trail flower light pattern.

FIG. 8*c* depicts a photograph 382 of a flower light pattern exhibited by a juggler performing appropriate maneuvers. The weight has two bundles of different lengths, and flower light pattern L384 is emitted from the bundle of greater length while a flower light pattern S384 of a weaker light intensity is emitted from the bundle of lesser length.

In some embodiments, two bundles, S60 and L60, are optically coupled to LEDs 100 and 102, respectively. The LEDs 100 and 102 may emit light of different colors. For example, with blue and red colors, respectively, ring S380 of FIG. 8*b* may emit blue light and ring L380 may emit red light.

Figure 9B:
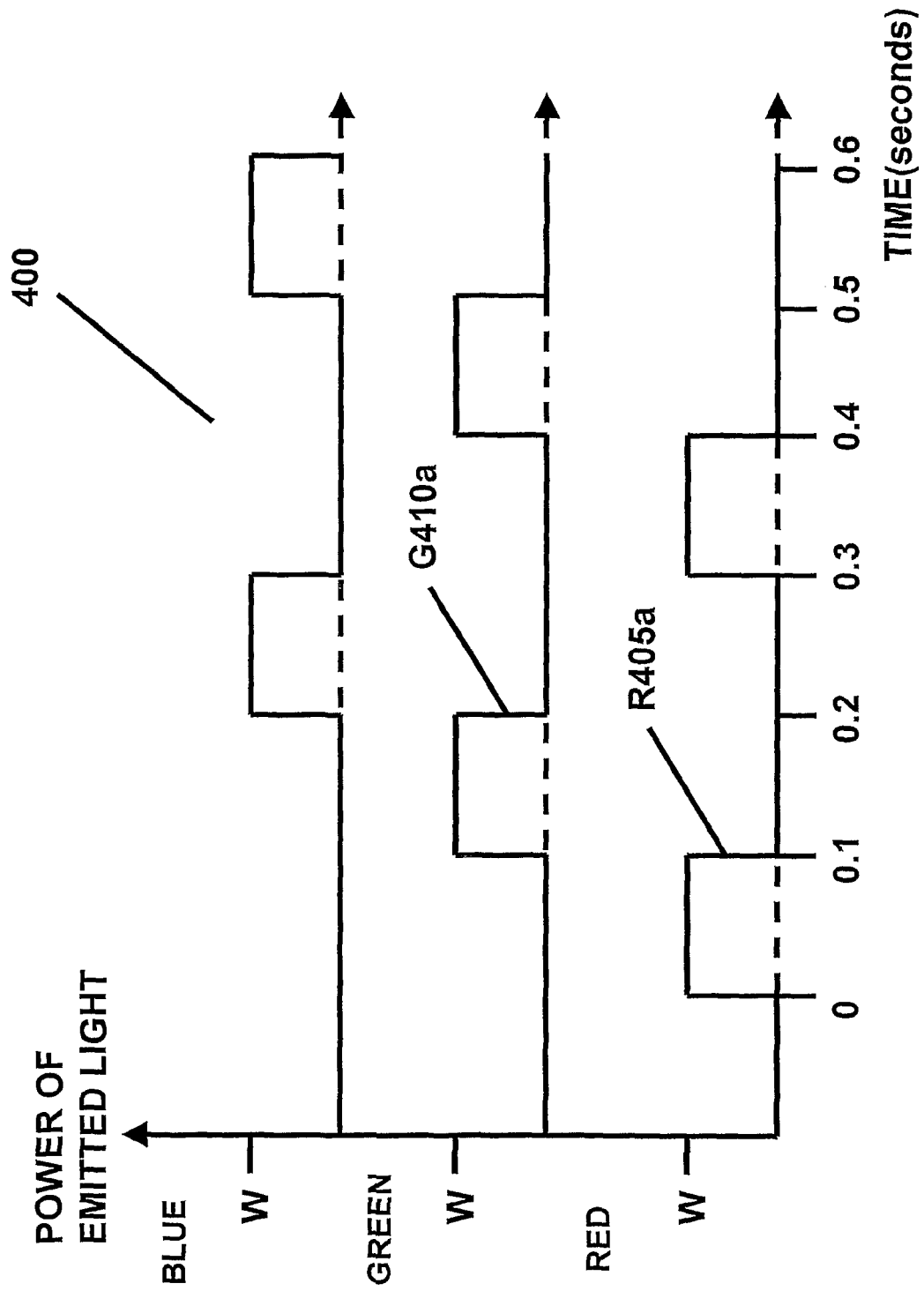
FIG. 9b shows the power of emitted light out of three colorful LEDs as a function of time according to some embodiments.
Figure 9C:
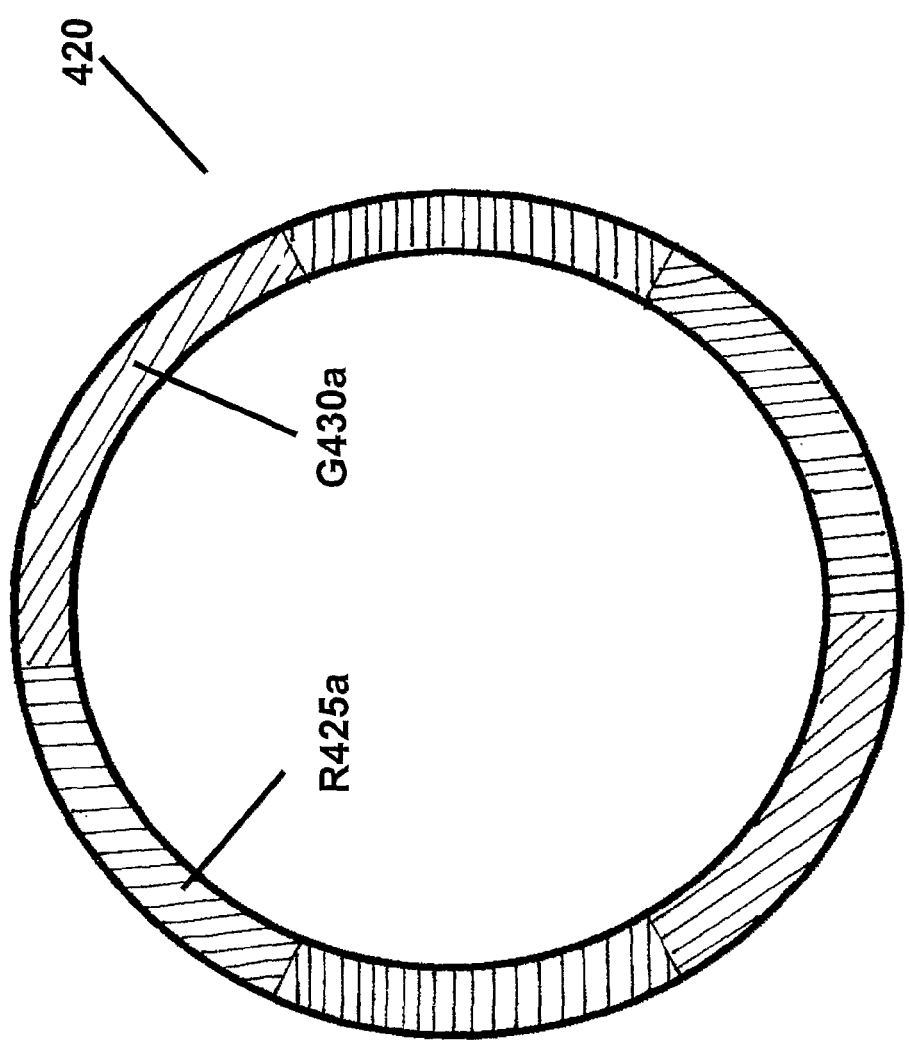
FIG. 9c is a schematic diagram of a ring light pattern of three different colors exhibited by a rotation move of a weight with three bundles of optical fibers optically coupled to three colorful LEDS while their distal ends are intermixed.

In some embodiments, the same ring zone may change color as illustrated in the exemplary illustrations of FIGS. 9*a*, 9*b* and 9*c*. FIG. 9*a* shows two LEDs, a red LED R106 and a green LED G106, optically coupled to two bundles R390 and G390, respectively. The ends of the optical fibers at distal end R394 of bundle R390 are closely intermixed with the ends of the optical fibers at distal end G394 of the second bundle G390. Thus, light from both bundles may be scattered out of the optical fibers in a common intermixture zone. Whenever red light and green light scatter simultaneously from the ends of the optical fibers of bundle R390 and from the ends of the optical fibers of bundle G390, respectively, the sensed color exhibited in the common intermixture zone is a colorimetric blend of the two colors.

FIGS. 9*b* and 9*c* illustrate a weight having, in addition to LED R106, bundle R390, LED G106 and bundle G390, a blue LED, optically coupled to a bundle with a distal end in the common intermixture zone of bundles R390 and G390. FIG. 9*b* shows an exemplary time dependence 400 of the power emitted by the three color LEDs. The weight 45 is rotating at 100 revolutions per minute. As determined by an illumination program 215, each of the LEDs emits a square pulse of 0.1 sec pulse width at a repetition rate of 200 pulses per minute. First, the red LED R106 is turned on for 0.1 sec, emitting light in temporal square wave R405*a*. At t=0.1 sec, LED R106 turns off, and LED G106 turns on for 0.1 sec, emitting green light in temporal square wave G410*a*, and similarly with the blue LED. A resulting light pattern in ring zone 420 is illustrated in FIG. 12*c*, where R425*a* is one sixth of a ring zone emitting red light from the optical fiber intermixture during the time of square pulse R405*a*, G430*a* is one sixth of a ring zone emitting green light from the optical fiber intermixture during the time of square pulse G410*a*, and similarly for the blue LED. Consequently, the whole ring zone 420 is emitting in red, green and blue.

Generally speaking, a set of three emitters of certain different colors may be used to get color perception of numerous different colors as taught by the practical science of colorimetry. For example, the common Red-Green-Blue (RGB) set is widely used in color displays of TV sets and computers. The screen is composed of sets of adjacent RGB emitters, and the intensity of emitted light at each color determines the obtained color perception.

Figure 10:
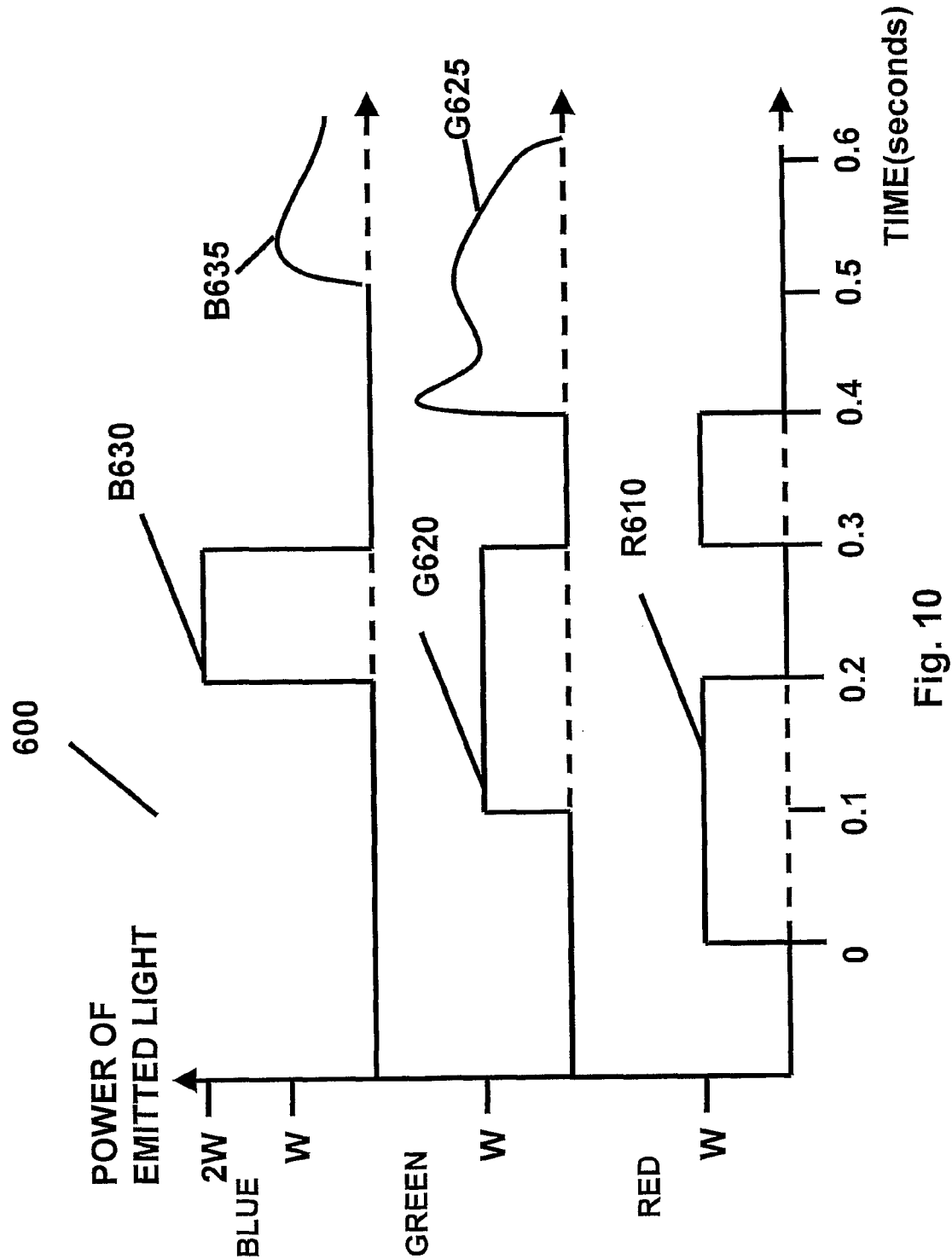
FIG. 10 shows the power of emitted light out of three colorful LEDs as function of time according to some embodiments.

In some embodiments, the aforementioned set of three RGB LEDs, optically coupled to three bundles terminating at a common intermixture zone, may emit light at temporally overlapping time sequences of variable intensity for each color. The exact time dependence for light emittance by each color LED is determined by an appropriate illumination program. An exemplary time dependence 600 is shown in FIG. 10. R610 and G620 overlap between t=0.1 sec and t=0.2 sec, such that a brown color perception is obtained due to an equal mixing of red and green colors. At t=0.2 sec, the red LED turns off and the blue LED turns on, emitting B630 at double power compared to the green light G620, with visual color perception as determined by colorimetry for such a mixture. At t=0.4 sec, the green LED emits G625 at variable intensity, whereas the blue LED starts to emit B635 also at variable intensity. Therefore, the obtained color perception is of a continuously changing color, rather than the segments of FIGS. 5 and 9c.

Figure 11:
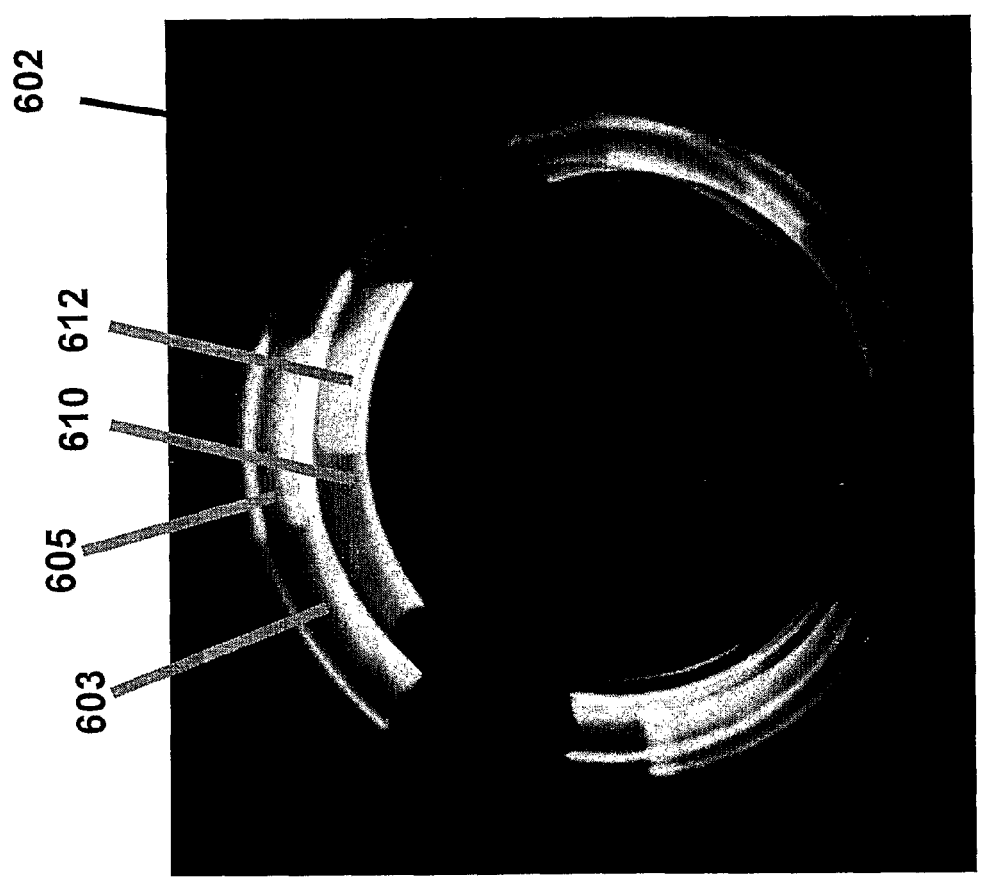
FIG. 11 is a grey scale photograph of a colorful light pattern.

Referring now to FIG. 11, photograph 602 shows several colorful light patterns, reflecting a spiral orbit of an illumination poi weight in the dark. Pink segment 603 and blue segment 605 are consecutive parts of one light trail, while pink segment 610 and blue segment 612 are consecutive parts of a second light trail, whereas the two light trails are consecutive. The juggler tries to keep the orbit fixed in space, and the deviation between adjacent trails reflects the spatial drift of the orbit. The rotation rate is almost synchronized with the temporal-colorimetric time dependence as determined by the illumination program in effect. Consequently, the two pink segments appear in lateral juxtaposition within a relatively small longitudinal distance. Some embodiments ensuring synchronization without dependence on the juggler's sense of tempo are described below.

Figure 12:
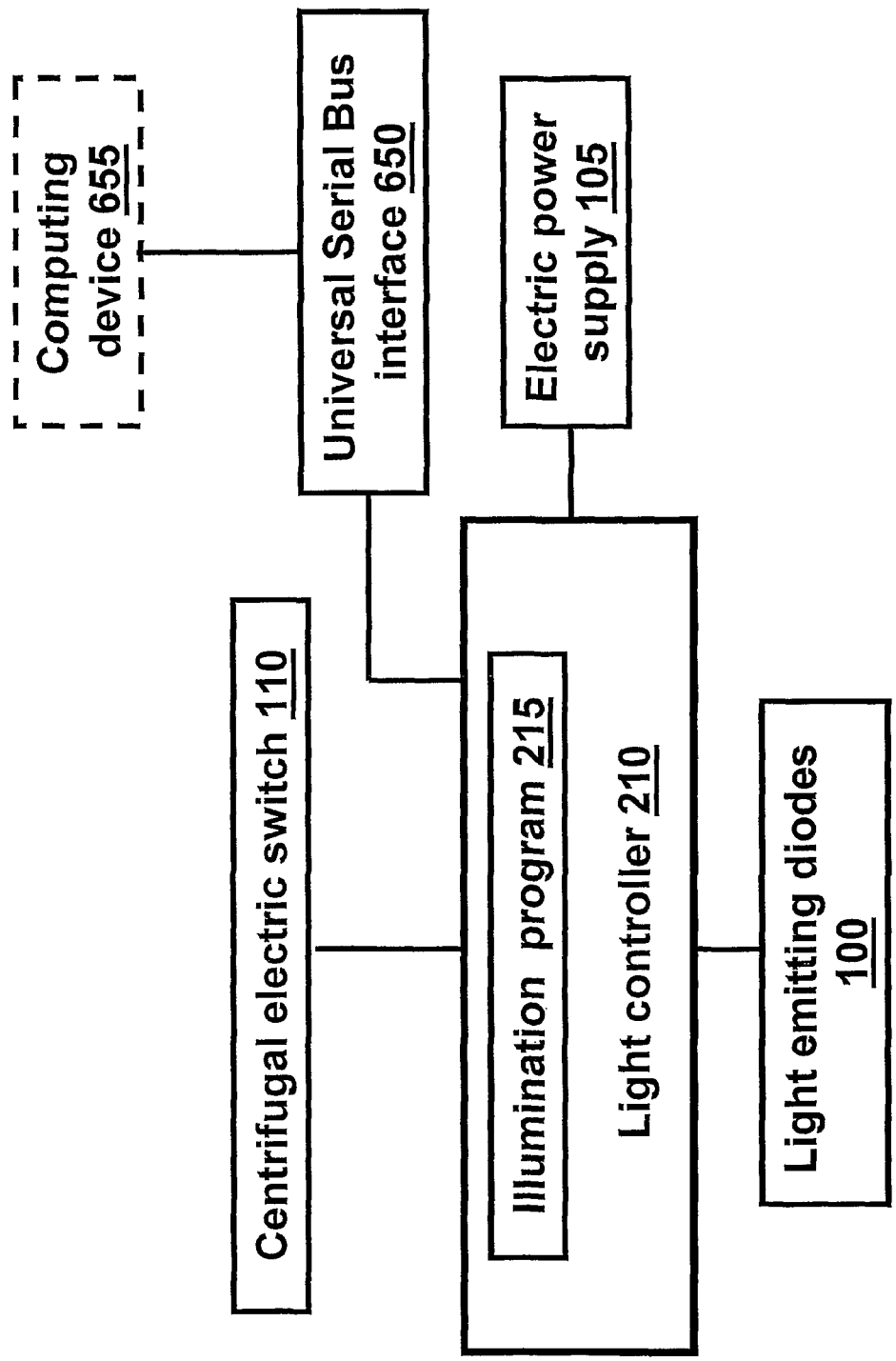
FIG. 12. is a block diagram of a weight connected through a USB interface to a computing device.

In some embodiments, the poi weight 45 further includes a communication interface, Universal Serial Bus (USB) interface 650 in the example of FIG. 12. The USB terminal is disposed in an aperture of the weight casing 50, and the USB terminal is connected to a computing device 655. The USB interface 650 is connected inside the casing to the light controller 210, which is connected to an electrical power supply 105. The USB interface 650 may be used for programming the light controller 210, loading it with illumination programs 215, for example.

In some embodiments, the electrical power supply is inside the casing, comprising a set of rechargeable batteries 105, and the USB interface may be used for charging the batteries.

In some embodiments, an illumination program may be coded with a color time sequence in the computing device 655 such as a personal computer. To facilitate the user visualizing the programmed sequence, the system may be configured to allow the user to actuate the poi to "run" the sequence, overriding centrifugal switch 110 so that the poi displays the sequence even while not turning. Alternatively, if the user wishes to try out the programmed sequence in motion, the USB interface 650 of the preceding paragraph may be used to connect the weight to the computing device 655 via a wire that is attached to suspension element 75 so that the poi can be swung while attached to the computing device. Alternatively, the connection between the computing device 655 and the light controller 210 may be conducted by a wireless connection.

Alternatively, or additionally, computing device 655 may include a graphic simulator for generating a simulation of the appearance of the illumination program on a display screen, for example, showing how the program will appear when the poi is swung. The simulated light exhibition may combine two simulations. The first is a simulation of the colorimetrical and temporal patterns determined by the illumination program that is under coding. The second simulation is a simulation of the orbit of a weight as determined by a juggler move. Thus, a juggler may simultaneously design a new juggler move and a corresponding new illumination program, getting optimal performance out of the two.

In some embodiments, the entire communication interface connecting the light controller and an external computing device is a wireless interface, BLUETOOTH for example.

In some embodiments, centrifugal switch 110 may be replaced or supplemented by other motion detecting sensors, an acceleration meter, for example.

In some embodiments, once turned on, the LED 100 emits light of a certain color at constant power level, and controller 210 controls the light entering the optical fibers by determining the power transmission from the LED 100 into the optical fibers using an electrically controlled variable optical switch, such as a liquid crystal modulator, a faraday rotator between two crossed polarizers, etc.

In some embodiments, the light emitters 100 comprise one or more visible laser diodes.

In some embodiments, the power supply is located outside of the weight, providing the weight with electrical power through an electric wire attached to the suspension element connected to the weight.

Figure 13:
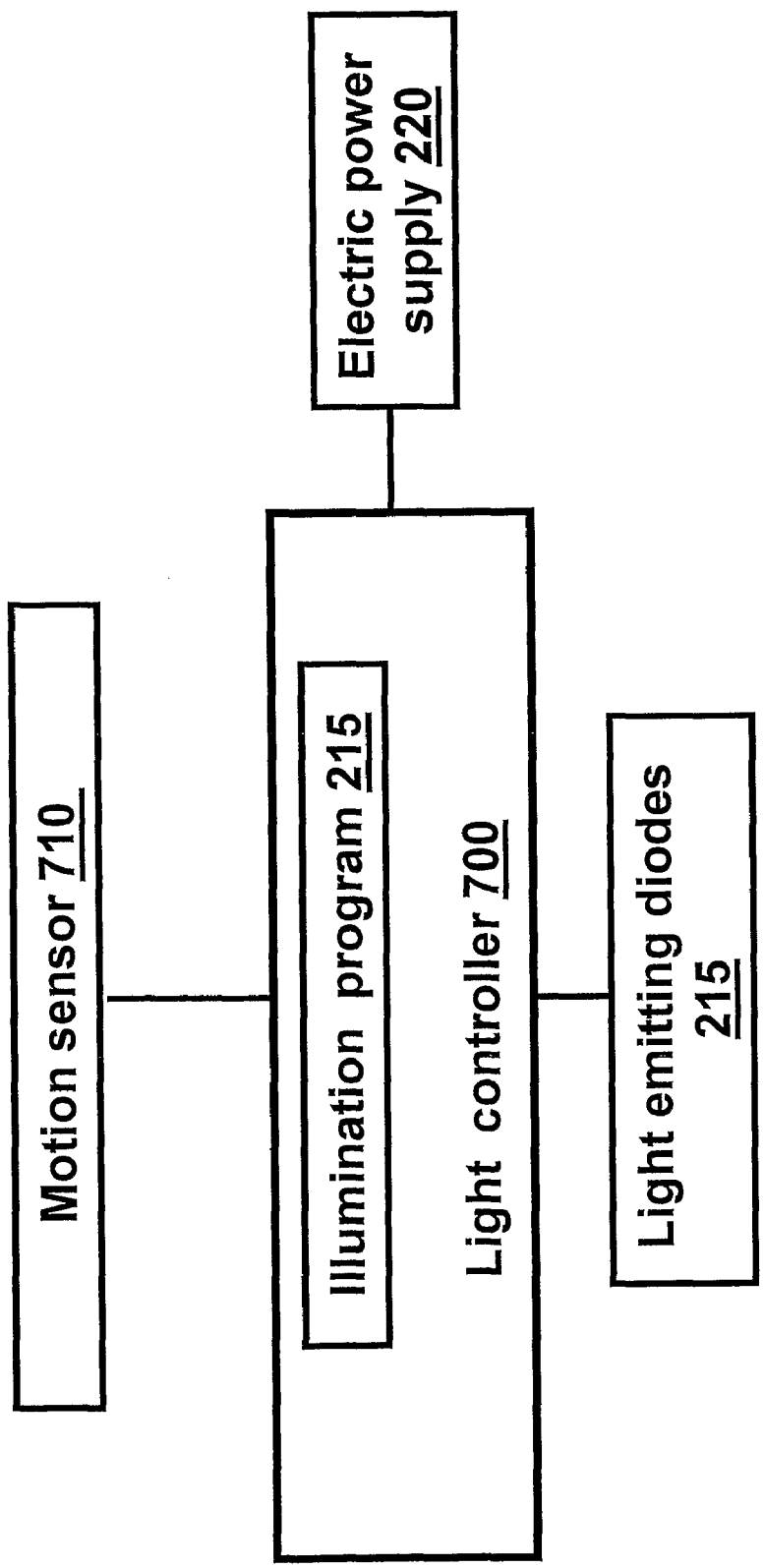
FIG. 13. is a block diagram of the electrical components of a weight according to some embodiments.

In some embodiments, depicted in FIG. 13, the microchip light controller 700 is loaded with illumination programs 215 and configured to receive motion data from a motion sensor 710. In one example, the motion sensor 710 is located outside the weight and it transmits the motion data to controller 700 via a wireless connection. In one example, the motion sensor measures rotation rate, velocity, acceleration, etc. Once the controller 700 gets the motion data, the controller 700 varies one or more parameters of light entrance inside the optical fibers 62 in accordance with one or more parameters of the weight motion, and in accordance with the illumination programs 215.

Figure 14:
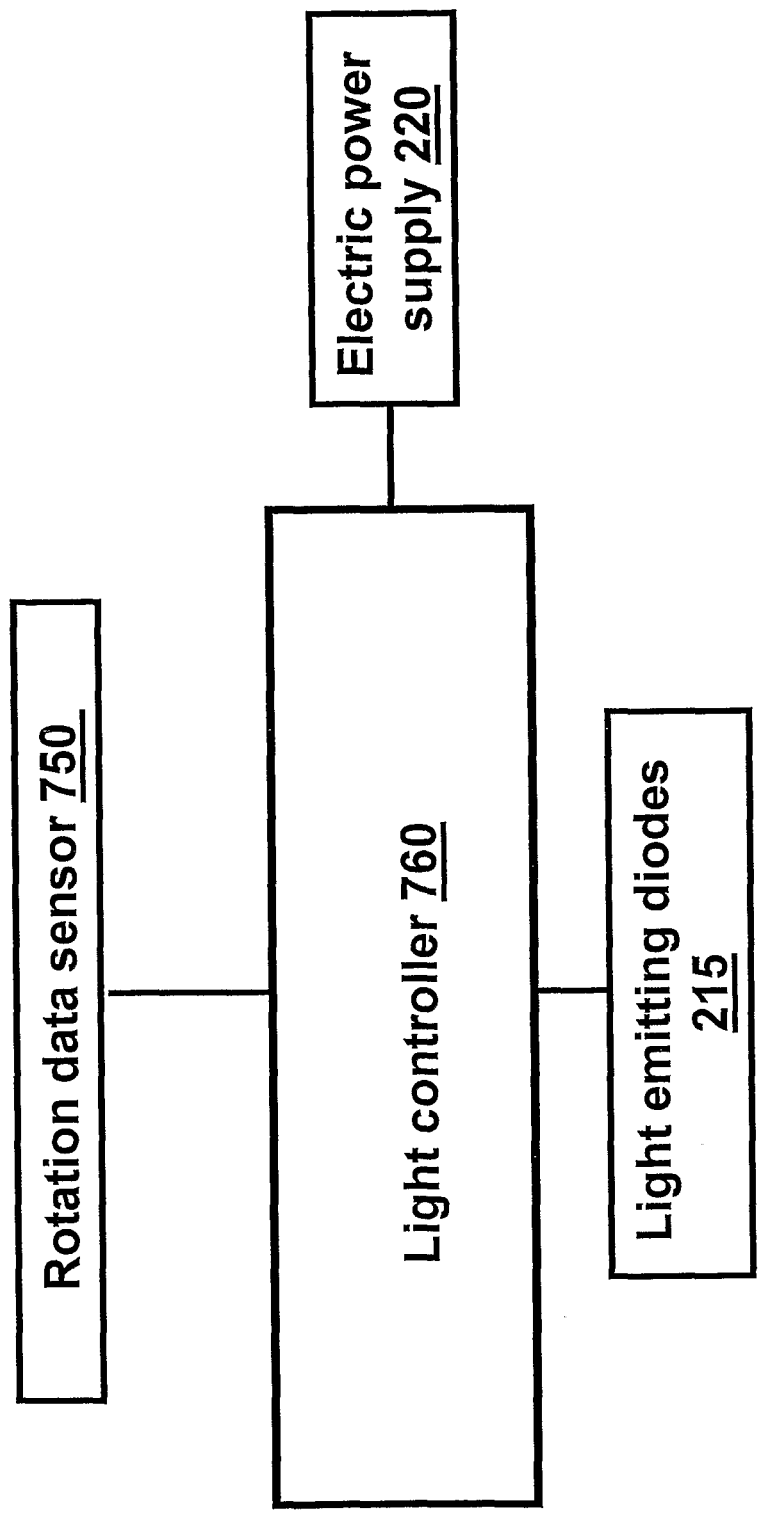
FIG. 14. is a block diagram of the electrical components of a weight according to some embodiments.

In some embodiments, illustrated in FIG. 14, the weight includes a rotation data sensor 750, and a light controller 760. The rotation data sensor may be one of those disclosed in U.S. Pat. No. 7,037,169 to Benedek. For example, the rotation data sensor may comprise an induction coil measuring a signal that reflects the change of the coil axis direction relative to the local direction of the Earth's magnetic field, and a fast Fourier transform computing module that extracts rotation rate from the changing sensed magnetic field.

During a juggler rotation move, the rotation data sensor 750 measures one or more rotation parameters, and transfers the rotation parameters to the light controller 760. Consequently, the light controller 760 varies one or more parameters of light entrance into the light waveguides 62 in accordance with one or more rotation parameters. For example only, the rotation data sensor may measure the rotation rate and the controller may determine that light will be emitted from a LED at a rate that is the rotation rate times an integer number. With three as the integer number, a light pattern similar to the light pattern of FIG. 9c may be kept synchronized independent of the weight rotation rate, as determined by the juggler.

Figure 15:
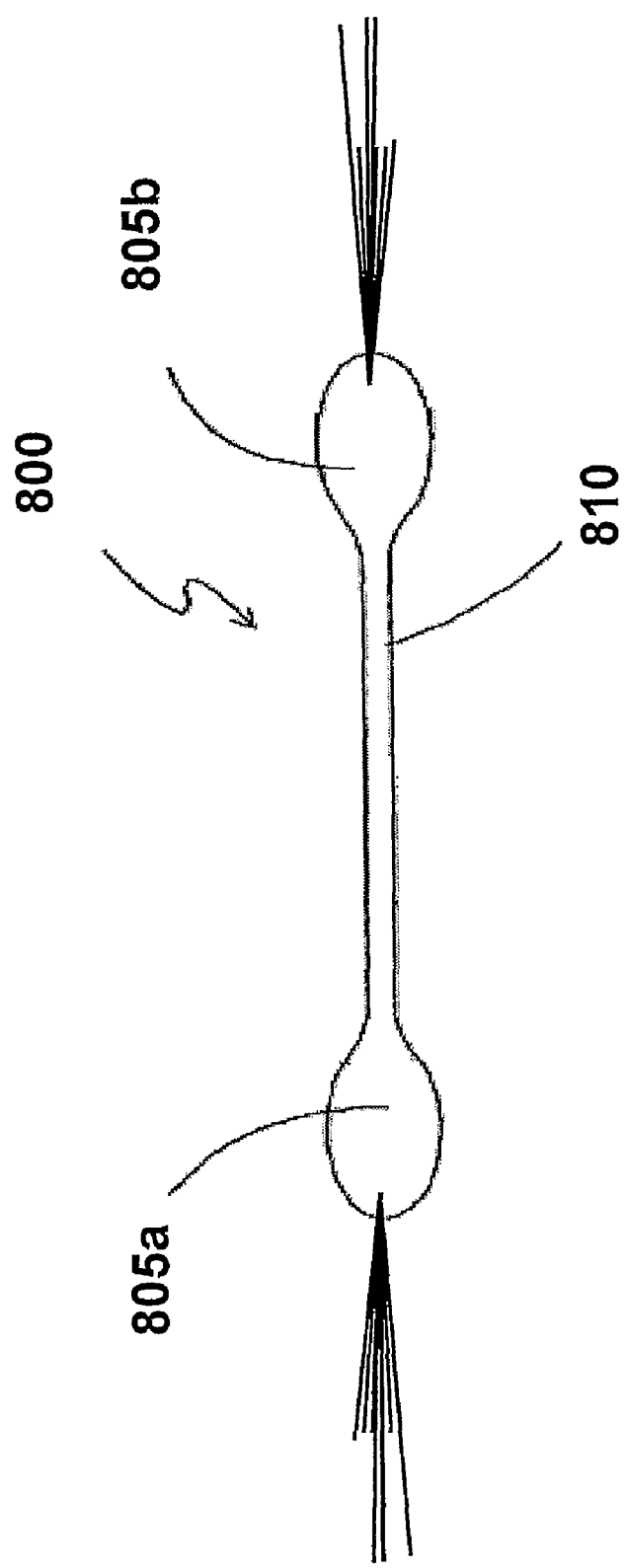
FIG. 15 illustrates a symmetric illumination poi.

In some embodiments, depicted in FIG. 15, the poi weight 805a of the present invention is connected 810 to another poi weight 805b of approximately the same weight and external shape. The two poi weights constitute a symmetric poi 800 as disclosed in U.S. Pat. No. 7,300,329 to the present inventor.

Figure 16:
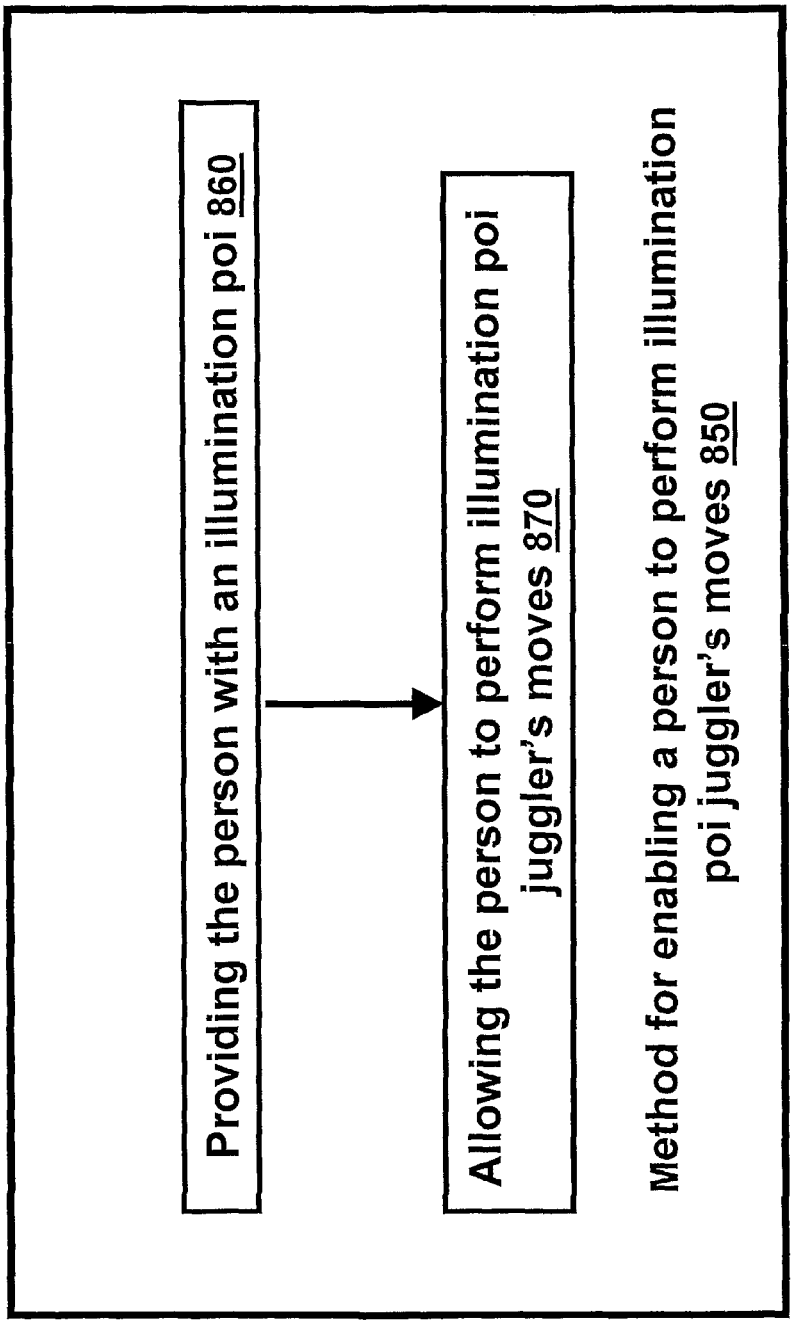
FIG. 16 is a flow chart of a method for enabling a person to perform illumination poi juggler's moves.

It is disclosed, for the first time, a method 850 of the present invention for enabling a person to perform illumination poi juggler's moves, which moves exhibit spectacular light patterns. The method 850, depicted in the flow chart of FIG. 16, includes the steps of providing 850 the person with an illumination poi and allowing 870 the person to perform illumination poi moves. The illumination poi comprises a suspension element and a weight connected to the suspension element. The weight includes a casing, one or more light emitters mounted inside the casing, one or more light waveguides, and one or more light controllers. The light waveguides have a proximal end optically coupled to at least one of the light emitters and a distal end disposed outside that casing. That distal end is configured to scatter light propagating in the light waveguide. The light controllers are associated to the one or more light emitters and configured to vary at least one parameter of the light entering into the one or more light waveguides.

Figure 17:
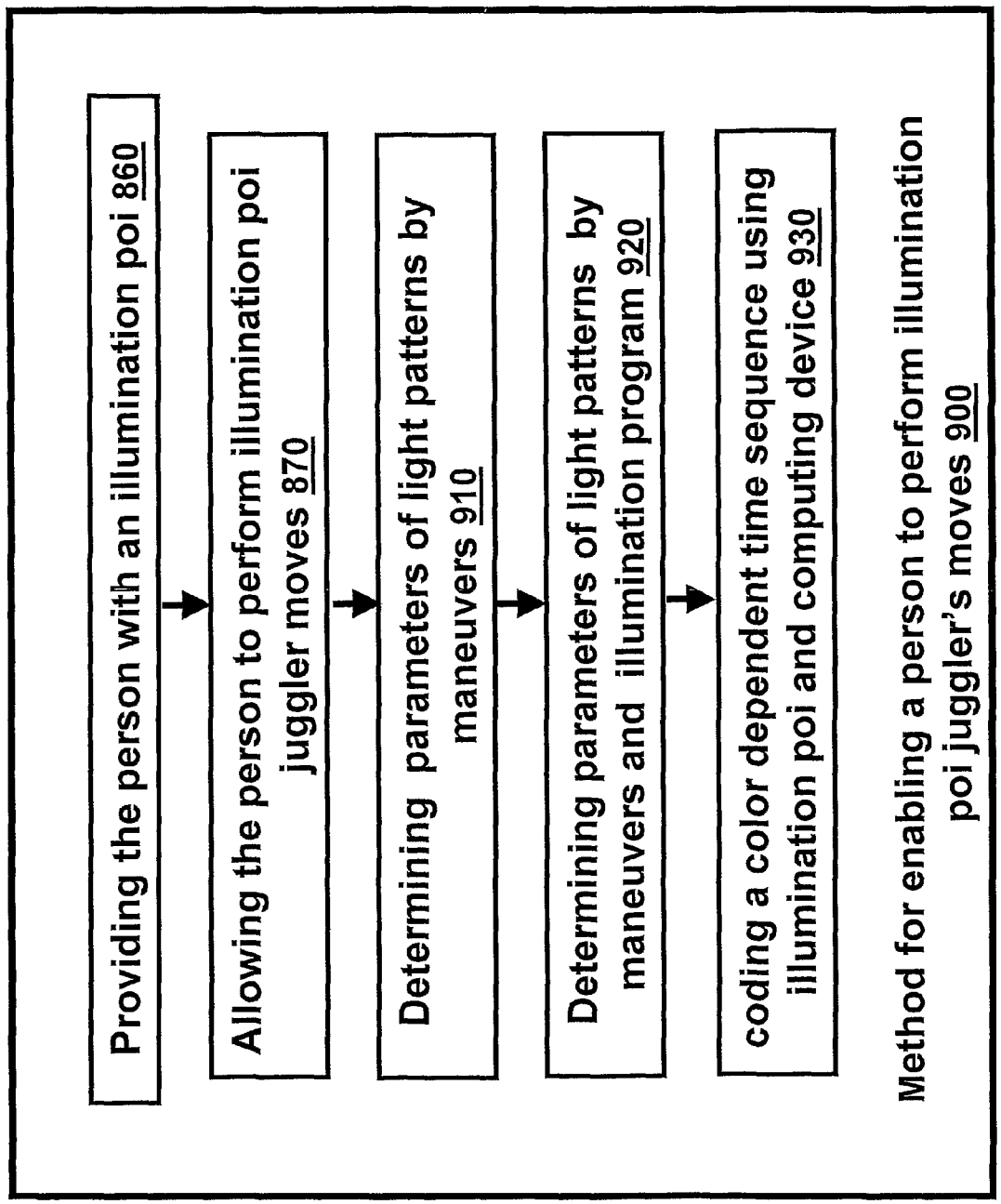
FIG. 17 is a flow chart of a method for enabling a person to perform illumination poi juggler's moves according to some embodiments.

In some embodiments, illustrated in the flow chart of FIG. 17, the person determines 910 one or more spatial parameters of the spectacular light patterns by maneuvers of the weight 45.

In some embodiments, also illustrated in the flow chart of FIG. 17, the person determines 920 one or more parameters of the spectacular light patterns by maneuvers conducted in accordance with the variation by a light controller 210 of one or more parameters of the light entering the light waveguides.

In some embodiments, illustrated in the flow chart of FIG. 17, the method 900 includes the step of coding 930 a color dependent time sequence in an illumination program using the illumination poi and computing device 655 connected to the illumination poi.

In some embodiments, the poi weight includes at least one flat light waveguide 950, as shown in the two views of FIGS. 18a and 18b. The flat waveguide 950 has a proximal end 955 enveloping LED 100 for efficient optical coupling. The flat waveguide has a distal end 960 flash with the external side of casing 50 that scatters light outside the casing.

In some embodiments, two color LEDS are coupled to the same flat light waveguide and the light scattered from the distal end is a colorimetric blend of the two colors.

In some embodiments, the poi weight comprise two or more non-planar flat waveguides such that some light is emitted into substantially full solid angle around the weight.

In some embodiments, the optical coupling configuration of the light emitters to the bundle of elongated and flexible light waveguides is based on lenses focusing the light of a LED into the proximal ends of the light waveguides.

In some embodiments, both the LED surface and the proximal end of the light waveguides are immersed in a translucent solid material having refractive index matched to both LEDs and light waveguides.

In some embodiments the light waveguides are silica-based optical fibers or polymer-based optical fibers.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way to the moves and maneuvers described.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A method for enabling a person to perform illumination poi moves, the method comprising the steps of:
    a) providing the person with an illumination poi, said illumination poi comprising:
        i) a suspension element;
        ii) a weight connected to said suspension element, the weight including
            A) a casing;
            B) one or more light emitters mounted inside casing;
            C) one or more light waveguides, each light waveguide having a proximal end optically coupled to at least one light emitter and a distal end disposed outside the casing and scattering light propagating in the light waveguide; and
            D) one or more light controllers varying automatically at least one parameter of the light entering into one or more light waveguides;
    and
    b) allowing the person to perform illumination poi moves.

2. The method of claim 1 wherein the weight has at least one cross section roughly shaped as an ellipse.

3. The method of claim 1 wherein the casing is made of a translucent material.

4. The method of claim 1 wherein the weight further comprising an elastic sheath disposed over the casing, said elastic sheath absorbs at least part of a shock occurring as a result of a collision between the weight and an entity.

5. The method of claim 1 the casing comprises two compartments and having an open state, in which state a user may dispose detachable objects within one of the compartments.

6. The method of claim 1 wherein said one or more light emitters comprise one or more light emitting diodes.

7. The method of claim 1 wherein the one or more light emitters are electrically empowered by one or more rechargeable batteries disposed within the casing.

8. The method of claim 1 wherein the light controller is loaded with two or more illumination programs.

9. The method of claim 1 wherein the weight further comprising a motion sensor,
    wherein the light controller varies at least one parameter of the light entering into one or more light waveguides in accordance with one or more parameters of weight motion.

10. The method of claim 1 wherein at least one of the light controllers is configured to receive one or more parameters of motion data, the light controller varies at least one parameter of the light entering into one or more light waveguides in accordance with said one or more parameters of motion data.

11. The method of claim 1 wherein the weight further comprising a switch and the suspension element is attached to the switch,
    wherein whenever the suspension element pulls the switch, the switch is turned on, switching the light controller on.

12. The method of claim 1 wherein the light waveguides comprise one or more optical fibers.

13. The method of claim 1 wherein the light waveguides comprise two groups of optical fibers, a first group of optical fibers of a first substantially equal length, and a second group of optical fibers of a second substantially equal length, the first length being greater than the second length.

14. The method of claim 1 wherein the light emitters comprise a first light emitter emitting a first color, and a second light emitter emitting a second color.

15. The method of claim 1 the light emitters comprise a first light emitter emitting a first color, and a second light emitter emitting a second color, the light emitted of the first emitted is intermixed with the light emitted of the second light emitter causing a color perception in accordance with a colorimetric blend of the two colors.

16. The method of claim 1 wherein the weight further comprising a communication interface connecting at least one of the light controllers to a device residing outside the weight.

17. The method of claim 1 wherein the light emitters comprise one or more visible laser diodes.

18. The method of claim 1 wherein the weight further comprising a rotation data sensor measuring one or more rotation parameters and transferring said one or more rotation parameters to said light controller, said light controller varying one or more parameters of light entrance to the light waveguides in accordance with said one or more rotation parameters.

19. The method of claim 1 wherein the weight further comprising at least one flat light waveguide, the flat waveguide has a proximal end configured for efficient optical coupling with at least one light emitter, and has a distal end configured to scatter light outside the casing in a wide light trail.

20. The method of claim 1 wherein the person determines one or more parameters of the spectacular light patterns by maneuvers conducted in accordance with the variation by a light controller of one or more parameters of the light entering the light waveguides.

21. The method of claim 1 further comprising the step of developing an illumination program using the illumination poi and a computing device connected to the illumination poi.

* * * * *

UNITED STATES PATENT AND TRADEMARK OFFICE
CERTIFICATE OF CORRECTION

| | | |
|---|---|---|
| PATENT NO. | : 8,292,484 B2 | Page 1 of 1 |
| APPLICATION NO. | : 12/532436 | |
| DATED | : October 23, 2012 | |
| INVENTOR(S) | : Shahar Cohen | |

It is certified that error appears in the above-identified patent and that said Letters Patent is hereby corrected as shown below:

Column 12:

Claim 15, line 58 should be corrected as follows:
Change:
-- 15. The method of claim 1 the light emitters comprise a first --
to
"15. The method of claim 14 the light emitters comprise a first"

Signed and Sealed this
Eighteenth Day of December, 2012

David J. Kappos
*Director of the United States Patent and Trademark Office*